United States Patent Office 3,326,870
Patented June 20, 1967

3,326,870
COPOLYMERS OF OLEFINS AND ACRYLONITRILE AND A PROCESS FOR PRODUCING THE SAME
Kohei Nakaguchi, Masaaki Hirooka, and Shigeru Morita, Niihama-shi, Japan, assignors to Sumitomo Chemical Company, Ltd., Osaka, Japan, a corporation of Japan
No Drawing. Filed June 10, 1964, Ser. No. 374,174
Claims priority, application Japan, June 14, 1963, 38/31,703
13 Claims. (Cl. 260—85.5)

The present invention relates to the copolymers of olefins and acrylonitrile and a process for producing the said copolymers. Especially, it relates to the alternating copolymers of acrylonitrile and terminal unsaturated olefinic hydrocarbon compounds having 2 to 20 carbon atoms, or their derivatives, and a process for producing the same.

It has so far been considered that it is extremely difficult to polymerize acrylonitrile by the cationic catalysts, while the anionic polymerization of acrylonitrile is easy due to the strong electron-attracting property of the nitrile group.

Contrarily, olefins such as propylene and isobutylene are easily subjected to the cationic polymerization in the presence of such Lewis acid as Friedel-Crafts catalyst, while in general, the polymers of olefins can hardly be formed or no reaction occurs at all by an anionic catalyst system.

Thus, in general, olefinic hydrocarbons and acrylonitrile are antipodal to each other in polarity, so one is well polymerized while another can hardly be polymerized by the same catalyst in the catalyst system of ionic polymerization. It has been, therefore, impossible to obtain the copolymers, or at least those having some practical values, of these compounds. It is well known that styrene, its derivatives, ethylene or the like are readily polymerized by the above mentioned catalyst but no homopolymer is obtained from propylene, isobutylene or the like, by use of a radical catalyst. As regards the copolymers, heretofore, the art has been unable to prepare the copolymer of propylene and acrylonitrile. In the case of copolymerization of acrylonitrile and α-olefins such as isobutylene, hexene-1 or the like, only the copolymer mainly consisting of acrylonitrile is obtained, for the monomer reactivity ratio of olefins is zero. Thus, in most cases, olefins, especially propylene, isobutylene or other α-olefins, can hardly be co-polymerized with acrylonitrile.

On the other hand, as a special case in radical copolymerization of olefins, there may be obtained an alternating copolymer of olefin and polar monomer in the ratio of 1:1. For example, maleic anhydride, maleimide, fumaryl chloride and the like are not subjected solely to radical polymerization, but subjected to the reaction with styrene, α-methylstyrene or the like to form the alternating copolymers. It is also known that fumaric acid ester reacts with isobutylene, propylene, ethylene or the like to form the copolymer of definite composition, independently of the monomer ratio. This is a special copolymerization between the monomers of opposite polarities, i.e., the strong electron-attracting property of carbonyl group in maleic or fumaric acid and the electron-releasing property of methyl group in olefins.

The alternating copolymerization of this kind of monomers is not possible with all combinations of the monomers of opposite polarities, but only special combinations of such monomers will copolymerize in this manner. It has so far been unknown how to produce the alternating copolymer of acrylonitrile and olefins, such as propylene, isobutylene or the like.

On the other hand, in the presence of Ziegler type catalyst known as the catalyst of coordinate anionic polymerization, acrylonitrile is hardly polymerized or only a very small amount of yellow-orange low polymer is obtained, which is different from reactions using common anionic catalyst. It is, contrarily, very easy to polymerize propylene solely to form isotactic or atactic polymers. Similarly, styrene, butene-1, hexene-1 and the like, have good polymerization activity. When the polymerization of the α-olefins, however, is carried out in the co-existence of acrylonitrile, the polymerization is extremely retarded by acrylonitrile to yield very little or no olefin containing polymer.

As for the other kinds of catalysts, there are organometallic compounds. For example, acrylonitrile is subjected by the organometallic compounds of metals of Group I and II of the Mendelieff's Periodic Table such as butyllithium, tetraethylcalciumzinc and the like, to anionic polymerization to form the corresponding polymer in a high yield. The polymer of acrylonitrile is also obtained in good yield by Grignard reagent.

It is also well known that the radical polymerization of acrylonitrile is carried out by the organic boron compound such as triethylboron, tributylboron or the like and a trace amount of oxygen. But it has not been known to copolymerize acrylonitrile and propylene or other olefins using these catalysts. Further, in case of using trialkylaluminum, acrylonitrile reacts to produce only a colored low molecular weight polymer in a very low yield. No polymerization occurs using tetraalkyltin as it is.

On the other hand, though aluminum halides such as aluminum chloride or the like are strong cationic catalysts for olefins such as propylene, ethylene, styrene, isobutylene and the like, acrylonitrile is only subjected to the co-ordination of the said halides to the nitrile group, and no polymerization takes place at all. Adding propylene or isobutylene to this mixture, no polymer containing acrylonitrile was obtained.

The present inventors have found that, by using, as the catalyst, organic aluminum halides of such average composition as represented by the general formula:

$$AlR_nX_{3-n}$$

wherein R represents an organic residue having 1 to 20 carbon atoms, X represents a halogen atom and $n$ is an arbitrary number of higher than 0 but lower than 3, acrylonitrile and terminal-unsaturated olefinic hydrocarbon compounds having 2 to 20 carbon atoms or the derivatives thereof are contacted together to produce the corresponding copolymer.

One object of the present invention is to provide a process for preparing a novel copolymer of acrylonitrile and olefins.

Another object of the present invention is to provide a process for preparing the alternating copolymers of acrylonitrile and propylene or other olefins.

Further object of the present invention is to provide novel copolymers of acrylonitrile and olefins. Still further object is to provide shaped articles manufactured from the novel copolymers of acrylonitrile and olefins.

To accomplish these objects the present invention provides a process for preparing copolymers of acrylonitrile and terminal-unsaturated olefinic hydrocarbons having 2 to 20 carbon atoms and the copolymers of acrylonitrile and the derivatives of terminal-unsaturated olefinic hydrocarbons having 2 to 20 carbon atoms, which comprises contacting acrylonitrile with a member selected from the group consisting of terminal-unsaturated olefinic hydrocarbons having 2 to 20 carbon atoms and the derivatives thereof, in the presence of an organo-aluminum halide of such average composition as represented by the general formula, $$AlR_nX_{3-n}$$

wherein R represents an organic residue having 1 to 20 carbon atoms, X represents a halogen atom and $n$ is an arbitrary number of higher than 0 but lower than 3.

The organoaluminum halides having the general formula, $AlR_nX_{3-n}$, for example, diethylaluminum chloride and ethylaluminum dichloride, per se are known polymerization catalysts. It has been reported that propylene is polymerized with ethylaluminum dichloride to form the corresponding liquid low molecular weight polymer, while styrene is polymerized to the corresponding solid low molecular weight polymer.

These polymerizations are considered to be carried out by the action of the organoaluminum halides as the cationic polymerization catalyst, and in general olefinic hydrocarbons are polymerized to form a low molecular weight polymer of relatively low utility value.

As the cationic polymerization of this kind is carried out by the action of aluminum halide as Lewis acid in the same manner with that of aluminum chloride, which is not observed when using trialkylaluminum.

On the other hand, acrylonitrile is not polymerized at all in the presence of organoaluminum halides having the general formula of $AlR_nX_{3-n}$, or only a very small amount of the low molecular weight polymer is obtained in the same manner as that of trialkylaluminum.

Unexpectedly, however, the present inventors have found that, in the system consisting of the compound of the general formula, $AlR_nX_{3-n}$, acrylonitrile and olefins, the polymerization is very rapidly effected even at such a low temperature as $-78°$ C. and the alternating copolymer can be obtained in a high yield within a short period of time. The copolymerization of this kind is based on a very special polymerization catalyst which is effective only in the coexistence of aluminum, halogen and organic groups. It is, moreover, interesting that the copolymer of acrylonitrile and common olefins such as propylene, butene-1, isobutylene according to the present invention is the 1:1 alternating copolymer.

According to the present invention, there are sometimes obtained partly the cationic polymer of olefins depending upon the polymerization condition. In most cases, however, it is possible to prepare only the alternating copolymer selectively by controlling the polymerization conditions properly. In other words, even under such condition that propylene is polymerized to the corresponding oily polymers by the cationic polymerization, only the alternating copolymer can be obtained by adding acrylonitrile to this system. This special effect has not been known at all. It has been very difficult in the common ionic catalyst system to obtain effectively the copolymer in the co-existence of two monomers because only one monomer is overwhelmingly polymerized by affecting the reactivities of the two monomers very differently due to a slight difference between the polarities of the two monomers. In the radical polymerization, good copolymerization ability can not be expected in general if there are such a great difference between the two monomers in the polarities as in the combination of the monomers used in the present invention. Therefore, one of the features of the present invention is an unexpectable strange phenomenon of that the alternating copolymer having 1:1 copolymer composition can be obtained.

The acrylonitrile-olefin copolymers obtained according to the present invention have very different properties from the homopolymers of each. Oily or semi-solid low molecular weight polymer is only obtained in case of polymerizing olefins such as propylene, butene-1, isobutylene and the like in the presence of organoaluminum halide of the general formula, $AlR_nX_{3-n}$, while the copolymer thereof with acrylonitrile is of white solid substance having high molecular weight. For example, the intrinsic viscosity of the 1:1 alternating copolymer of propylene and acrylonitrile is 0.2–10 dl/g. which is obtained from the measurement of the solution viscosity thereof in dimethylformamide. This indicates that it has almost the same molecular weight as that of polyacrylonitrile obtained by the conventional radical polymerization. The specific gravity is about 1.0 which is different from 0.86 for amorphous polypropylene or 1.17 for polyacrylonitrile. Moreover, polyacrylonitrile has no distinct melting point and is decomposed at 250°–280° C. in nitrogen atmosphere, while the copolymers according to the present invention melt before the decomposing point thereof which is much higher than that of polyacrylonitrile. For example, the alternating copolymer of propylene and acrylonitrile is softened at 140° to 150° C. to the molten state and begins to decompose at 400° C. That is, it is much more stable than polyacrylonitrile against thermal decomposition. Those behaviors can be observed by differential thermal analysis. By this analysis, the apparent melting point of 140° to 150° C. is confirmed to be not the melting point but a kind of softening point. The copolymer has no distinct melting point and may be regarded as amorphous high molecule.

According to X-ray diffraction pattern, however, it has been clearly observed that it also has the diffraction peak corresponding to that of acrylonitrile at $2\theta = 16.4°$ which is caused by the hydrogen bond of nitrile group. As the half value width of the diffraction band in the copolymer is much broader than that of polyacrylonitrile, the copolymer is considerably more amorphous than polyacrylonitrile. When the copolymer is stretched about 5 times, distinct orientation of the copolymer structure is observed in the diffraction pattern of the stretched sample.

On the other hand, there are observed in infra-red absorption spectrum of the copolymer not only the characteristic absorptions of acrylonitrile and propylene but also considerably strong absorption at 935 cm.$^{-1}$, which exists specifically in the copolymer only.

The solubilities of the copolymer for various organic solvents are different from that of homopolymers. The examples are as shown in Table 1.

TABLE 1.—SOLUBILITIES OF PROPYLENE-ACRYLONITRILE ALTERNATING COPOLYMER

| Solvent | Oily polypropylene | Polyacrylonitrile | Propylene-acrylonitrile copolymer |
|---|---|---|---|
| Xylene | o | x | x |
| Acetonitrile | x | x | o |
| Formamide | x | x | x |
| Dimethylformamide | x | o | o |
| Dimethylsulfoxide | x | o | o |
| Acetone | x | x | o |
| Ethylene dichloride | o | x | o |
| Cyclohexanone | o | x | o |
| Acetic anhydride | x | x | o |

The copolymer is soluble in dimethylformamide and dimethyl sulfoxide but insoluble in xylene, which is the same as polyacrylonitrile, while the copolymer is the same as oily polypropylene in respect to solubility in ethylene dichloride or cyclohexanone. However, the copolymer is soluble in acetonitrile, acetone or acetic anhydride, this is a different property from that of acrylonitrile or propylene homopolymers.

Those characteristic properties, as explained above, indicates clearly that the copolymers according to the present invention have different properties from those of homopolymers. Therefore, the copolymers of this kind are novel compounds which have so far been unknown.

The copolymers according to the present invention are available for many uses, for example, moulding products, film, fiber, compounding materials, binding agent or the like. The copolymers can also be used in mixture with other polymers or other substances. It can also be used by modifying the properties thereof through the reaction of the polymers. The treatment for use of this kind includes the conversion of the copolymer to the substances of three dimensional structure by a cross linking.

For example, the propylene-acrylonitrile alternating copolymer can readily be pressed at a temperature above the softening point, or it is processed to film or sheet by the conventional appropriate process. Film or sheet thus obtained is flexible and transparent. In tensile test, the tensile strength of sheet is excellent, for example, 350 kg./cm.² Further, it is also one of the characteristics of the copolymers according to the present invention that they can be processed by press extrusion, which is impossible for the conventional polyacrylonitrile.

As the copolymers can not only be molten but also dissolved in various solvents to a considerably large extent while polyacrylonitrile is very limited in solubility the copolymers can be worked by melt spinning or solution spinning to prepare yarns. The obtained yarn can be stretched 5 times or more to prepare the oriented products.

Although the properties of the copolymers have been explained concretely by taking an example of propylene-acrylonitrile alternating copolymer mainly, the copolymers of acrylonitrile and other olefins have the similar properties as described above.

In the performance of the process according to the present invention, suitable olefins include terminal-unsaturated olefin hydrocarbon compounds having 2 to 20 carbon atoms or the derivatives thereof, which are well polymerizable generally in the presence of cationic catalysts, for example, propylene, ethylene, butene-1, isobutene, pentene-1, hexene-1, heptene-1, octene-1, 3-methylbutene-1, 2-methylpentene-1, 4-methylpentene-1, 4-methylhexene-1, 4-phenylbutene-1, styrene, α-methylstyrene, α-butylstyrene, p-dimethylaminostyrene, p-methoxystyrene, p - methylstyrene, m - methylstyrene, vinylcyclobutane, vinylcyclohexane and the like.

The catalyst is the organoaluminum halides of such average composition as represented by the general formula, $$AlR_nX_{3-n}$$

wherein R represents an organic residue having 1 to 20 carbon atoms, X represents a halogen atom, and $n$ is an arbitrary number of higher than 0 but lower than 3. It is desirable that the organoaluminum halides have hydrocarbon groups or the derivative groups, thereof, for example, alkyl, aryl, aralkyl, alkylaryl, or cycloalkyl group. As for X, chlorine, bromine or iodine are suitable. For example, as the R, methyl, ethyl, propyl, butyl, hexyl, octyl, dodecyl, stearyl, phenyl tolyl cyclohexyl, cyclopentadienyl, or benzyl group or the like, or the derivative groups thereof are preferred.

The compounds wherein $n$ equals to 0 or 3, that is, aluminum halide and trialkyl aluminum, have no copolymerizing ability, so it is essential that R and X are present at the same time. However, $n$ needs not be an integer, so the mixture and complex compound of the different compounds of integer $n$ is also available if it can be regarded apparently within the general formula of $AlR_nX_{3-n}$. The typical compounds available for the process of the present invention are ethylaluminum dichloride, i-butylaluminum dichloride, phenylaluminum dichloride, cyclohexylaluminum dichloride, methylaluminum dichloride, methylaluminum dibromide, ethylaluminum dibromide, ethylaluminum diiodide, ethylaluminum sesquichloride, ethylaluminum sesquibromide, methylaluminum sesquichloride, methylaluminum sesquibromide, phenylaluminum sesquiiodide, diethylaluminum chloride, ethylphenylaluminum chloride, dicyclohexylaluminum chloride and the mixtures thereof with trialkylaluminum or aluminum halide and the mixtures of trialkylaluminum and aluminum halide.

The amount of catalyst component against monomer can vary, for example, from 0.01 to 10 mol per 1 mol of acrylonitrile.

In the process of the present invention, it is important to form the complex of acrylonitrile and the catalyst component. By using almost the same amount by mol of the catalyst component as that of acrylonitrile, the copolymerization can effectively be carried out and the copolymers of good quality are obtained. Thus, it is a quite novel polymerization process that, when the amount of the catalyst component is approximately the same with that of the monomer, the polymerization is carried out most effectively. The formation of the complex of organoaluminum halide and acrylonitrile can be confirmed experimentally. In the infra-red absorption spectrum, the absorption band of nitrile group is shifted from 2220 cm.$^{-1}$ to 2270 cm.$^{-1}$, while the absorption of double bond of 1600 cm.$^{-1}$ is not changed, so it can be considered that the organic aluminum halide is coordinated to the nitrile group of acrylonitrile. The polarity of acrylonitrile is much increased by this coordination, which is readily considered to have a close relation with the polymerization activity. When acrylonitrile and organoaluminum halide are mixed together by the equivalent quantity with each other at the low temperature, the complex obtained is not polymerized itself even at room temperature or higher. The polymerization of acrylonitrile has heretofore been modified by adding metallic salts. For example, it has been known in case of radical polymerization that the rate of polymerization reaction is promoted by adding $AgNO_3$, LiCl or the like. The radical polymerization of methyl methacrylate by adding $ZnCl_2$ has also been reported.

The addition of metallic salts in these polymerizations takes place merely for auxiliary effect but not as the catalyst substantially. The process of the present invention is completely different from the conventional process in respect to the polymerization type, for the metallic compound of the present invention has a catalytic action and no radical catalyst component is required in the process of the present invention.

The steps of addition and mixing of the catalyst and monomers can generally be varied. Especially in case of low temperature reaction, the homopolymerization of each monomer substantially does not occur in most cases, so no particular order of addition is necessarily required to form the copolymer only. For example, the following procedures may optionally be chosen: a process of mixing monomers previously, adding a solvent, if desired, and adding the catalyst thereto; a process of previously mixing acrylonitrile with a catalyst to form the complex thereof, and adding an olefin or blowing it in gaseous form thereto; a process of previously mixing an olefin with a catalyst and adding or continuously dropping acrylonitrile thereto; or a process of continuously performing the said steps and taking out the reaction product.

At relatively high temperatures, however, the cationic polymerization of olefins tends to take place, so it is necessary to select the order of addition and the polymerization conditions to obtain the copolymer selectively. For example, there are available several processes, that is, when the catalyst should not previously be in contact with one of the monomers, mixing the catalyst with another or mixing both monomers in advance and adding the catalyst to the mixture.

In most cases, the alternating copolymers are obtained according to the present invention. When the alternating copolymers are obtained, the polymer composition is independent of the monomer composition. The yield, molecular weight and other properties of the polymer, however, depend upon the mixing ratio of olefin to acrylonitrile, so the proper mixing ratio of the monomers is determined according to the purposes. In general, by using excess amount of olefin against the acrylonitrile, the polymer yield based upon the acrylonitrile can be increased.

The polymerization temperature can arbitrarily be selected from −150° C. to +100° C. The polymerization system according to the present invention is usually very active, for example, the polymeriztion is completed for several to several tenths minutes even at −78° C. The homo-polymerization is negligible at such a low temperature, therefore, such a low temperature is suitable for obtaining the pure copolymer. Additionally at low temperature, a gaseous monomer at normal temperature can be liquified and polymerized in uniform liquid phase under atmospheric pressure.

On the other hand, if low temperatures can not easily be attained, the copolymer is also effectively obtained at room temperature or higher. A gaseous monomer at normal temperature can be polymerized under normal or higher pressure. It is necessary to carry out the polymerization usually in an inert gas atmosphere and in the absence of water, oxygen or the like.

According to the present invention, bulk polymerization can be carried out in a liquid monomer but a common inactive solvent can also be used. Those solvents include common hydrocarbons or halogenated hydrocarbons, such as propane, butane, pentane, hexane, heptane, octane, ligroine, petroleum ether, other petroleum mixture solvents, benzene, toluene, xylene, cyclohexane, methylcyclohexane, carbon tetrachloride, chloroform, methylene dichloride, ethylene dichloride, trichloroethylene, tetrachloroethylene, hexachloroethane, butyl chloride, chlorobenzene, bromobenzene and the like.

A compound which reacts with the catalyst component of the general formula $AlR_nX_{3-n}$ to form the stable complex thereof is not suitable as the solvent. Especially, such a compound as forms the complex having stronger bond than that of acrylonitrile with the catalyst should not be used. The unsuitable solvents are ethers such as ethyl ether, tetrahydrofuran, ketones, or nitriles.

After the completion of polymerization, the after-treatment is carried out by the conventional method to purify and recover the polymerization product. Those methods are, for example, alcohol treatment, alcohol-hydrochloric acid treatment, hydrochloric acid aqueous solution treatment, alkali treatment of the conventional after treatments in the conventional cationic polymerization by Lewis acid or the polymerization by Ziegler-Natta catalyst.

Furthermore, the catalyst component can be separated and recovered from the polymerization product by adding such a compound as forms the complex with the catalyst without decomposing it.

The concrete examples according to the present invention are given below for the purpose of illustration only.

*Example 1*

Into a stainless steel reaction vessel having 500 ml. internal volume, 80 ml. of heptane were charged in nitrogen gas atmosphere and cooled to —78° C. with Dry Ice-methanol. To this, 80 g. of propylene were introduced and liquified, and then 1.5 g. of acrylonitrile were added and mixed uniformly. This mixture was added with a n-heptane solution of 80 mmol. of ethylaluminum dichloride. After 10 minutes, the polymerization was stopped by adding methanol thereto and the reaction mixture was taken out, and filtered to separate the solid component. After treating the obtained solid component with hydrochloric acid methanol mixture, it was cleaned sufficiently with methanol to obtain white amorphous solid polymer. It was dried in vacuum at 50° C. and weighed 2.35 g. Upon the viscosity measurement which was carried out at 30° C. by dissolving the said product in dimethylformamide, the intrinsic viscosity showed 2.25 dl/g. (which corresponded to the polymerization degree of 1,500 for polyacrylonitrile). The nitrogen content was measured to be 15.05% by Kjeldahl method. As this corresponds to 51.3 mol. percent of acrylonitrile, it may be considered that the almost 1:1 alternating copolymer was obtained. The specific gravity of this copolymer was 0.993 by flotation method and the softening point was 141° to 145° C.

The produce polymer obtained by the similar process was subjected to a press to obtain a transparent sheet, which showed tensile strength of 350 kg./cm.$^2$.

While the polymer was formed to filaments by melt-spinning process and then stretched 6 times. The resulting filament set forth a significant fiber diagram by X-ray.

*Example 2*

The same process as in Example 1 was carried out except using diethylaluminum chloride instead of ethylaluminum dichloride as the catalyst, and 1.28 g. of similar copolymer were obtained.

*Example 3*

The same process as in Example 1 was carried out except using 40 mmol of ethylaluminum sesquichloride instead of ethylaluminum dichloride and 2.59 g. of solid polymer were obtained.

*Example 4*

Thirty g. of propylene were liquidized in nitrogen atmosphere in a glass reaction vessel, and were added with 2 g. of acrylonitrile. Adding 50 mmol of methylaluminum sesquibromide under stirring at —78° C. thereto, the polymerization was performed without any solvent for 10 minutes. The obtained polymer weighed 1.29 g., the intrinsic viscosity was 6.81 and the nitrogen content was 14.88% by the elementary analysis.

*Example 5*

One and a half kg. of propylene was liquified at —78° C. in a reaction vessel of 5 l. internal volume, added with 73.0 g. of ethylaluminum dichloride and mixed together uniformly. To this mixture, 30 g. of cooled acrylonitrile were added.

The polymerization was continued at —78° C. As the stirring became impossible due to the filling of polymer in the interior after 30 minutes, propylene was subjected to purge and recover and the after-treatment was carried out by the conventional method. The obtained white polymer was dissolved in dichloroethane and precipitated in methanol. These reprecipitation procedures were conducted twice for purifying the polymer. After the purification, the yield was 20.84 g. The intrinsic viscosity was 3.00. The results of elementary analysis were C:75.54, H:9.68 and N:14.41, which were in fair agreement with the theoretical values of C:75.74, H:9.53 and N:14.72 for 1:1 alternating polymer thereof.

*Example 6*

In a glass flask with a stirring device, 20 ml. of n-heptane, 50 mmol of ethylaluminum dichloride and 2 g. of acrylonitrile were mixed at —78° C. in nitrogen atmosphere and the temperature of the mixture was raised to 0° C. The precipitation of polyacrylonitrile was not observed under stirring. By blowing propylene gas under atmospheric pressure into this mixture, a white polymer started to precipitate and the stirring became impossible. The polymerization was carried out for 5 hours, to obtain 0.78 g. of white polymer having the intrinsic viscosity of 0.41.

By keeping the same recipe but changing the order of mixing to propylene-acrylonitrile-(catalyst+solvent), the polymerization was carried out at —78° C. The yield of polymer was 0.75 g. and the intrinsic viscosity was 6.66 using 20 g. of propylene.

*Example 7*

In nitrogen atmosphere, 100 g. of propylene and 2 g. of acrylonitrile were mixed together at —78° C. and 30 mmol of triethylaluminum were added and 20 mmol of ethylaluminum dichloride were added thereto in this order. The 10 minutes polymerization yielded 0.16 g. of the alternating copolymer.

*Example 8*

The same process as in Example 6 was carried out except using 50 mmol of ethylaluminum sesquichloride to form the complex with 2 g. of acrylonitrile. The polymerization was continued by blowing butene-1 at 25° C. for 3 hours. According to the results of elementary analysis of the obtained white solid polymer, N content was 12.76% which was in fair agreement with the theoretical value of 12.83% in the 1:1 alternating copolymer.

Example 9

In the same apparatus as in Example 6, 24.6 mmol of aluminum tribromide were dissolved in 62 ml. of toluene at room temperature in nitrogen atmosphere and were added with 1.0 g. of acrylonitrile to form the complex thereof. This complex was added with 8.1 g. of hexene-1 and then 5 mmol of triethylaluminum. After 2 hours of reaction at room temperature, being treated with methanol the white solid copolymer was obtained.

Example 10

Twenty g. of hexene-1 and 2 g. of acrylonitrile were charged into a glass reaction vessel and the mixture were cooled to −78° C. and were added with 50 mmol of ethylaluminum dichloride under stirring.

After carrying out the reaction for 10 minutes, 0.65 g. of the white solid polymer were obtained. In infra-red absorption spectrum, the characteristic absorptions of the both monomers were observed and it was confirmed to be the 1:1 alternating copolymer by the results of elementary analysis.

Example 11

Using the same apparatus as in Example 1, into which 150 ml. of n-heptane, 2 g. of acrylonitrile and ethylene (charged until the pressure reached to 10 kg./cm.$^2$) were added and a n-heptane solution of 100 mmol of ethylaluminum dibromide was added thereto under pressure.

After the completion of the 3 hours of reaction, the contents were taken out and treated with hydrochloric acid-methanol mixture to obtain 0.83 g. of a white solid polymer. It was insoluble in dimethylformamide and the nitrogen content was 5.17% by the elementary analysis.

Example 12

In the same apparatus as in Example 1, the polymerization was carried out at −78° C. by using 5 g. of acrylonitrile, 15 g. of isobutylene, 126 mmol of ethylaluminum dichloride and 150 ml. of n-heptane, to obtain 4.84 g. of heptane-insoluble polymer and 3.91 g. of heptane-soluble polymer. The heptane-soluble polymer was a colorless semi-molten substance, which was considered to be polyisobutylene. The heptane-insoluble part was a yellowish white solid and the infra-red absorption thereof indicated that it contained the nitrile group and isobutylene unit.

Example 13

In nitrogen atmosphere in a glass reaction vessel, at −78° C., 20 ml. of heptane, 15 g. of isobutylene and 1.5 g. of acrylonitrile were mixed together and the mixture was added with 25 mmol of diethylaluminum monochloride. The polymerization was carried out for 10 minutes, to obtain 0.805 g. of the white solid polymer. The polymer was soluble in acetone, but insoluble in petroleum ether. By the infra-red absorption thereof, there were observed the characteristic absorption which were respectively caused by the nitrile group and isobutylene, but which were considerably different from those of the corresponding homopolymer. On the other hand, when isobutylene only was polymerized under the same polymerization conditions, 1.71 g. of polyisobutylene which were insoluble in acetone and soluble in petroleum ether were obtained.

According to these results, it may be said that the copolymer was selectively prepared in this copolymerization experiment. The obtained polymer was confirmed to be the 1:1 alternating copolymer by the elementary analysis, which gave the following values—
Obs.: C, 76.44%; H, 10.65%; N, 12.26%. Calcd.: C, 77.01%; H, 10.16%; N, 12.83%.

Example 14

In the same apparatus as in Example 1, the polymerization was carried out at −78° C. by using 5 g. of acrylonitrile, 15 g. of styrene, 150 ml. of n-heptane and 10 mmol of ethylaluminum dichloride, to obtain 4.12 g. of the white powder polymer which was insoluble in heptane. This polymer was soluble in dimethylformamide and the infra-red absorption spectrum thereof indicated the absorptions caused by the nitrile group and styrene.

What we claim is:
1. A copolymer consisting essentially of a 1:1 alternating copolymer of acrylonitrile and a terminally unsaturated olefinic hydrocarbon having 2 to 20 carbon atoms.
2. A copolymer consisting essentially of a 1:1 alternating copolymer of acrylonitrile and a compound selected from the group consisting of ethylene, propylene, butene-1, isobutylene, hexene-1, and styrene.
3. A process for preparing a copolymer which comprises copolymerizing acrylonitrile with a terminally unsaturated olefinic hydrocarbon having 2 to 20 carbon atoms in the presence of organoaluminum halide having an average composition of the formula:

$$AlR_nX_{3-n}$$

wherein R represents an alkyl residue having 1 to 20 carbon atoms, X represents a halogen atom and $n$ is a number higher than 0 and less than 3, at a temperature ranging from about −150° to about +100° C., the amount of the organoaluminum halide being about 0.01 to 10 moles per mole of acrylonitrile.
4. A process according to claim 3, wherein the organoaluminum halide is at least one member selected from the group consisting of ethylaluminum dichloride, ethylaluminum dibromide, ethylaluminum sesquichloride, methylaluminum sesquibromide, diethylaluminum monochloride, diethylaluminum monochloride and triethylaluminum, aluminum tribromide and triethylaluminum.
5. A process according to claim 3, wherein about 1 mole of the organoaluminum halide is used per mole of acrylonitrile.
6. A process according to claim 3, wherein acrylonitrile is mixed with the organoaluminum halide to obtain a complex, and the terminally unsaturated olefinic hydrocarbon is added to the complex.
7. A process according to claim 3, wherein the organoaluminum halide is mixed with the terminally unsaturated olefinic hydrocarbon, and acrylonitrile is added to the mixture.
8. A process according to claim 3, wherein acrylonitrile is mixed with the terminally unsaturated olefinic hydrocarbon, and the organoaluminum halide is added to the mixture.
9. A process according to claim 3, wherein an excess amount of the terminally unsaturated olefinic hydrocarbon is used.
10. A process according to claim 3, wherein the copolymerization reaction is effected in the absence of solvent.
11. A process according to claim 3, wherein the copolymerization reaction is effected in the presence of a solvent selected from the group consisting of hydrocarbons and halogenated hydrocarbons.
12. A film manufactured from the alternating copolymer according to claim 1.
13. A fiber consisting essentially of the alternating copolymer of claim 1.

References Cited

UNITED STATES PATENTS

| | | | |
|---|---|---|---|
| 2,945,018 | 7/1960 | Fischer | 260—93.7 |
| 3,162,621 | 12/1964 | Enk et al. | 260—85.5 |

FOREIGN PATENTS

| | | |
|---|---|---|
| 843,611 | 8/1960 | Great Britain. |
| 871,686 | 6/1961 | Great Britain. |
| 951,025 | 3/1964 | Great Britain. |

JOSEPH L. SCHOFER, *Primary Examiner.*

H. WONG, *Assistant Examiner.*